(12) United States Patent  (10) Patent No.: US 8,753,702 B2
Baker et al.  (45) Date of Patent: Jun. 17, 2014

(54) PRINTING ON EDIBLE SUBSTRATES

(75) Inventors: Richard Baker, West Lebanon, NH (US); Howard T. Baldwin, Downers Grove, IL (US); Edward T. Chrusciel, Nashua, NH (US)

(73) Assignee: FUJIFILM Dimatix, Inc., Lebanon, NH (US)

( * ) Notice: Subject to any disclaimer, the term of this patent is extended or adjusted under 35 U.S.C. 154(b) by 1453 days.

(21) Appl. No.: 10/761,008

(22) Filed: Jan. 20, 2004

(65) Prior Publication Data

US 2005/0157148 A1    Jul. 21, 2005

(51) Int. Cl.
*B41J 3/407*    (2006.01)

(52) U.S. Cl.
USPC ............................ 426/383; 426/302

(58) Field of Classification Search
USPC ............. 426/383, 87, 88, 249, 250, 104, 302; 347/99, 100, 95, 101
IPC .................................................. B41J 2/00,3/47
See application file for complete search history.

(56) References Cited

U.S. PATENT DOCUMENTS

| | | |
|---|---|---|
| 1,501,724 A | 7/1924 | Rasmussen |
| 2,011,182 A | 8/1935 | Nutting |
| 4,024,096 A | 5/1977 | Wachtel |
| 4,045,397 A | 8/1977 | Parkinson |
| 4,158,847 A * | 6/1979 | Heinzl et al. .................. 347/40 |
| 4,421,779 A | 12/1983 | Baker et al. |
| 4,562,081 A * | 12/1985 | Buttermann, III ............ 426/101 |
| 4,825,227 A | 4/1989 | Fischbeck et al. |
| 4,849,768 A | 7/1989 | Graham |
| 4,892,602 A | 1/1990 | Oike et al. |
| 4,910,661 A | 3/1990 | Barth et al. |
| 4,937,598 A | 6/1990 | Hine et al. |
| 5,142,967 A * | 9/1992 | Herting ............................ 99/373 |
| 5,273,575 A | 12/1993 | de Saint Romain |
| 5,340,656 A | 8/1994 | Sachs et al. |
| 5,407,474 A | 4/1995 | Airey et al. |
| 5,443,628 A | 8/1995 | Loria et al. |
| 5,453,122 A * | 9/1995 | Lyon ........................... 106/31.37 |
| 5,597,620 A | 1/1997 | Martino |
| 5,637,139 A * | 6/1997 | Morelos et al. ............ 106/31.37 |
| 5,643,667 A * | 7/1997 | Tsukioka ...................... 428/344 |
| 5,645,889 A | 7/1997 | Potosky et al. |
| 5,659,346 A | 8/1997 | Moynihan et al. |
| 5,714,236 A | 2/1998 | Withington et al. |
| 5,757,391 A | 5/1998 | Hoisington |
| 5,771,052 A | 6/1998 | Hine et al. |

(Continued)

FOREIGN PATENT DOCUMENTS

| | | | |
|---|---|---|---|
| CN | 1443226 | 9/2003 | |
| DE | 19510232 A1 * | 10/1996 | ................ A23L 1/00 |

(Continued)

OTHER PUBLICATIONS

Viscosity chart; date N/A; http://pumplocker.com/images/lit/WEI1/FLUX-HIGH-VISCOSITY-B0000-VISC-CHART-1.PDF; 1 page*

(Continued)

*Primary Examiner* — Steven Leff
(74) *Attorney, Agent, or Firm* — Fish & Richardson P.C.

(57) ABSTRACT

Printing on delicate surfaces, such as flowable food products, is described.

38 Claims, 3 Drawing Sheets

(56) References Cited

U.S. PATENT DOCUMENTS

| | | | |
|---|---|---|---|
| 5,895,682 A * | 4/1999 | Tsukioka | 426/383 |
| 5,922,473 A | 7/1999 | Muthiah et al. | |
| 5,938,826 A * | 8/1999 | Baker et al. | 106/31.29 |
| 6,058,843 A | 5/2000 | Young | |
| 6,093,239 A * | 7/2000 | Baker et al. | 106/31.29 |
| 6,207,003 B1 | 3/2001 | McClure et al. | |
| 6,322,619 B1 | 11/2001 | Lesani et al. | |
| 6,326,332 B1 | 12/2001 | Takayama | |
| 6,328,793 B1 | 12/2001 | Malhotra et al. | |
| 6,334,890 B1 | 1/2002 | Goodbrand et al. | |
| 6,336,963 B1 | 1/2002 | Malhotra et al. | |
| 6,336,965 B1 | 1/2002 | Johnson et al. | |
| 6,342,096 B1 | 1/2002 | Kurabayashi | |
| 6,348,679 B1 | 2/2002 | Ryan et al. | |
| 6,350,500 B1 | 2/2002 | Drummond et al. | |
| 6,350,795 B1 | 2/2002 | Breton et al. | |
| 6,355,290 B1 * | 3/2002 | Soehnlen et al. | 426/393 |
| 6,361,640 B1 | 3/2002 | Kamen et al. | |
| 6,372,030 B1 | 4/2002 | Malhotra et al. | |
| 6,376,000 B1 * | 4/2002 | Waters | 426/383 |
| 6,391,135 B1 | 5/2002 | Drummond et al. | |
| 6,395,077 B1 | 5/2002 | Malhotra | |
| 6,395,551 B1 | 5/2002 | Kipke et al. | |
| 6,398,857 B1 | 6/2002 | Malhotra et al. | |
| 6,401,002 B1 | 6/2002 | Jang et al. | |
| 6,402,316 B1 | 6/2002 | Ichinose et al. | |
| 6,402,823 B1 | 6/2002 | Garcia Sainz et al. | |
| 6,410,465 B1 | 6/2002 | Lim et al. | |
| 6,432,194 B2 | 8/2002 | Johnson et al. | |
| 6,436,499 B1 | 8/2002 | Krampe et al. | |
| 6,447,976 B1 | 9/2002 | Dontula et al. | |
| 6,455,150 B1 | 9/2002 | Sheppard et al. | |
| 6,460,964 B2 | 10/2002 | Osborne | |
| 6,461,417 B1 | 10/2002 | Malhotra et al. | |
| 6,478,863 B2 | 11/2002 | Johnson et al. | |
| 6,479,142 B1 | 11/2002 | Condon et al. | |
| 6,479,584 B1 | 11/2002 | Nakagawa et al. | |
| 6,486,901 B1 | 11/2002 | DeBoer et al. | |
| 6,494,943 B1 | 12/2002 | Yu et al. | |
| 6,506,245 B1 | 1/2003 | Kinney et al. | |
| 6,509,393 B2 | 1/2003 | Malhotra et al. | |
| 6,511,926 B1 | 1/2003 | Kauffman et al. | |
| 6,514,659 B1 | 2/2003 | Dontula et al. | |
| 6,536,345 B1 * | 3/2003 | Young | 347/106 |
| 6,537,656 B1 | 3/2003 | Dontula et al. | |
| 6,541,098 B2 | 4/2003 | Venkatasanthanam et al. | |
| 6,544,369 B1 | 4/2003 | Kitamura et al. | |
| 6,544,613 B1 | 4/2003 | Varadarajan et al. | |
| 6,548,149 B1 | 4/2003 | Liu et al. | |
| 6,550,905 B1 | 4/2003 | Deckers | |
| 6,576,329 B2 | 6/2003 | Kong | |
| 6,586,501 B1 | 7/2003 | Dalton et al. | |
| 6,589,626 B2 | 7/2003 | Selinfreund et al. | |
| 6,593,398 B2 | 7/2003 | Breton et al. | |
| 6,596,067 B2 | 7/2003 | Menzel et al. | |
| 6,596,112 B1 | 7/2003 | Ditter et al. | |
| 6,600,142 B2 | 7/2003 | Ryan et al. | |
| 6,601,502 B2 | 8/2003 | Kamen et al. | |
| 6,617,557 B1 | 9/2003 | Ryan et al. | |
| 6,673,416 B1 | 1/2004 | Nishio | |
| 6,689,406 B2 | 2/2004 | Kuehl et al. | |
| 6,811,840 B1 | 11/2004 | Cross | |
| 2001/0050016 A1 | 12/2001 | Ohsawa et al. | |
| 2002/0054197 A1 | 5/2002 | Okada et al. | |
| 2004/0021757 A1* | 2/2004 | Shastry et al. | 347/106 |
| 2005/0067292 A1 | 3/2005 | Thompson et al. | |
| 2005/0157148 A1 | 7/2005 | Baker et al. | |
| 2006/0210681 A1 | 9/2006 | Churnick | |
| 2006/0286218 A1 | 12/2006 | Salzman | |
| 2007/0071851 A1 | 3/2007 | Baker et al. | |
| 2008/0075859 A1 | 3/2008 | Baker et al. | |

FOREIGN PATENT DOCUMENTS

| | | | | |
|---|---|---|---|---|
| EP | 1 038 689 | | 9/2000 | |
| JP | H02-050191 | | 2/1990 | |
| JP | 6504576 | | 5/1994 | |
| JP | H06-218712 | | 8/1994 | |
| JP | 08113746 A | * | 5/1996 | C09D 11/00 |
| JP | 2002174878 | | 6/2002 | |
| JP | 2002288734 | | 10/2003 | |
| JP | 2003535923 | | 12/2003 | |
| JP | 2005531330 | | 10/2005 | |
| WO | 97/04398 | | 2/1997 | |
| WO | WO 97/04398 | | 2/1997 | |
| WO | 01/25018 | | 4/2001 | |
| WO | WO 01/94116 | | 12/2001 | |
| WO | WO 0194116 | * | 12/2001 | B41J 2/00 |
| WO | 03/048260 | | 6/2003 | |
| WO | WO 03048260 | * | 6/2003 | C09D 11/12 |
| WO | WO 2004003089 A1 | * | 1/2004 | |
| WO | WO 2005/069925 | | 8/2005 | |

OTHER PUBLICATIONS http://www.foodnetwork.com/food/recipes/recipe/0,1997,FOOD_9936_33285,00.html, in related U.S. Appl. No. 11/560,493.

Standard Test Method for Kinematic Viscosity of Transparent and Opaque Liquids (and the Calculation of Dynamic Viscosity), An American National Standard, British Standard 2000: Part 71:1990, Designation: D 445-03, pp. 1-10.

Measurements of Rheological Parameters, FDSC 4005 Lab, pp. 1-7.

BiODE, Technical White Paper, Viscosity Measurement with AVM3003, 2003, 4 pgs.

Fluide Design Inc.—Industrial Pump Training, Pump Consultin, Pump Literature and So . . . , http://www.fluidedesign,com/about_fluids.htm, retrieved from the internet on Oct. 20, 2003, 5 pgs.

Viscosity, a sticky subject, http://xtronics.com/reference/viscosity.htm, retrieved from the internet on Oct. 20, 2003, 8 pgs.

U.S. Customs Service Laboratory Methods, Aug. 21, 1998, 14 pgs.

Linx Continuous Ink Jet Printers, Guaranteed Quality and Immediate Support, 1 page, (2003).

Patent Database Search Results: "hot melt" AND ink and food in 1976 to present, http://patft.uspto.gov/netacgi/nph-Parser?Sect1=PTO2&Sect2=HITOFF&u=%2Fnetahtml1% . . . , retrieved from the internet on Sep. 9, 2003, 2 pgs.

Office action dated Sep. 21, 2010 issued in Chinese Application No. 200780042177.6, 27 pgs.

Search Report dated Oct. 19, 2010 issued in European Application No. 07868764.7, 3 pgs.

Office action dated Dec. 29, 2010 issued in U.S. Appl. No. 11/775,530, 17 pgs.

Office action dated May 7, 2010 issued in Chinese Application No. 200580004984.X, 28 pgs.

Communication pursuant to Article 94(3) EPC dated Jul. 4, 2012 in EP Application No. 12 151 423, 8 pages.

Office action dated Feb. 28, 2012 dated in Japanese application No. 2009-537350, with English Translation, 5 pgs.

Korean Office Action, with English translation, KR Application No. 10-2009-7012478, dated Oct. 17, 2013, 27 pages.

Chinese Office Action, with English Translation, CN Application No. 200580004984X, dated Mar. 20, 2009, 5 pages.

Chinese Office Action, with English Translation, CN Application No. 200580004984X, dated Sep. 11, 2009, 5 pages.

Chinese Office Action, with English Translation, CN Application No. 200580004984X, dated Dec. 25, 2009, 27 pages.

International Preliminary Report on Patentability, PCT/US2005/001646, mailed Mar. 1, 2007, 7 pages.

(56) References Cited

OTHER PUBLICATIONS

International Preliminary Report on Patentability, PCT/US2007/084771, mailed May 28, 2009, 7 pages.

International Search Report and Written Opinion, PCT/US2005/01646, date of completion of search Dec. 19, 2006, 9 pages.

International Search Report & Written Opinion, PCT/US2007/84771, mailed Nov. 10, 2008, 8 pages.

Japanese Office Action, with English Translation, JP Application No. 2006-551225, mailed Dec. 1, 2009, 6 pages.

Japanese Office Action, with English Translation, JP Application No. 2006-551225, mailed Apr. 13, 2010, 4 pages.

Non-final Office Action, U.S. Appl. No. 11/560,493, mailed Jan. 28, 2009, 12 pages.

* cited by examiner

PRINTING ON EDIBLE SUBSTRATES

TECHNICAL FIELD

This invention relates to printing, particularly on edible substrates.

BACKGROUND

Ink jet printers are one type of apparatus for depositing drops on a substrate. Ink jet printers typically include an ink path from an ink supply to a nozzle path. The nozzle path terminates in a nozzle opening from which ink drops are ejected. Ink drop ejection is typically controlled by pressurizing ink in the ink path with an actuator, which may be, for example, a piezoelectric deflector, a thermal bubble jet generator, or an electrostatically deflected element. A typical print assembly has an array of ink paths with corresponding nozzle openings and associated actuators. Drop ejection from each nozzle opening can be independently controlled. In a drop-on-demand print assembly, each actuator is fired to selectively eject a drop at a specific pixel location of an image as the print assembly and a printing substrate are moved relative to one another. In high performance print assemblies, the nozzle openings typically have a diameter of 50 microns or less, e.g. around 25 microns, are separated at a pitch of 100-300 nozzles/inch, have a resolution of 100 to 3000 dpi or more, and provide drops with a volume of about 1 to 120 picoliters (pl) or less. Drop ejection frequency is typically 10 kHz or more.

A piezoelectric actuator has a layer of piezoelectric material, which changes geometry, or bends, in response to an applied voltage. The bending of the piezoelectric layer pressurizes ink in a pumping chamber located along the ink path. Piezoelectric ink-jet print assemblies are also described in Fishbeck et al U.S. Pat. No. 4,825,227, Hine U.S. Pat. No. 4,937,598, Moynihan et al. U.S. Pat. No. 5,659,346 and Hoisington U.S. Pat. No. 5,757,391, the entire contents of which are hereby incorporated by reference. It is sometimes desirable to print on food products. An edible ink for a piezoelectric ink jet printer is described in WO 03/048260, the entire contents of which is hereby incorporated by reference. It is sometimes desirable to print on ice cream.

SUMMARY

In an aspect, the invention features providing an ink jet printer capable of ejecting a series of drops for deposition on a substrate in a predetermined pattern, providing a consistency-maintaining a product, e.g. a food product, having gravity flowability of about 50% or more in 24 hours, and applying to the food product from the ink jet printer a series of media drops in a predetermined pattern, the drops having a drop volume of about 200 pL or less In another aspect, the invention features providing an ink jet printer capable of ejecting a series of drops for deposition on a substrate in a predetermined pattern, providing a product such as a food product having a gravity-flowability of about 50% or more in 24 hours, applying to the food product a series of media drops in a predetermined pattern, the drops having a volume of about 200 pL or less, the media on the food product having an image bleed of about 10% or less in 30 minutes, and after applying the media, processing the food product to increase or decrease gravity flowability.

In another aspect, the invention features a consistency-maintaining, e.g. edible, substance having a gravity-flowability of about 50% or more in 24 hours. The substance includes an image visible from its surface. The image is defined by a predetermined series of drops having a resolution of about 50 dpi or greater and an image bleed of about 10% or less in about 10 minutes.

Embodiments may include one or more of the following. After applying the media, the food product is processed to decrease gravity flowability or increase the viscosity. The food product is cooled, e.g., to about 32° F. or less. After applying the media, the food product is enclosed in a container. The food product is enclosed in a container prior to increasing the viscosity. The food product has a viscosity of about 50,000 cps or less. The food product has a viscosity of about 50 to 110 cps and the drop volume is about 120 pL or less. The ink jet printer is a drop on demand ink jet printer. The ink jet printer is a piezoelectric ink jet printer. The ejection media is heated to a temperature of about 40 to 140° C. The printing is at a resolution of 50 dpi or more, e.g. 100 or 200 dpi or more. The ejection media has a viscosity greater than the viscosity of the food product at the temperature of the food product during application of the media. The ejection media has a viscosity less than the viscosity of the food product at the temperature of the food product during application of the media. The ejection media has a viscosity of about 8-20 cps under ejection conditions. The ejection media has a viscosity of about 70-100 cps at room temperature. The ejection media has a water soluble carrier. The ejection media is predominantly an alcohol or acid, or water or combination thereof.

Embodiments may also include one or more of the following. The ejection media is substantially insoluble in the food product. The ejection media includes a visible dye. The ejection media includes a flavor additive. The food product is a dairy product. The food product is ice cream or yogurt. The food product is a coffee drink, e.g., including a dairy product. The food product is at a temperature of about room temperature or greater while applying the media. The food product is served to a consumer within about 45 minutes of applying said media. The media on the food product has an image bleed of about 10% or less in 10 minutes or 30 minutes or more after applying the media. The gravity flowability of the food product is free-flowing. The image bleed is about 2% or less. The image bleed is about 2% or less in about 30 minutes.

Embodiments may include one or more of the following advantages. A high resolution, multicolor image can be formed on a delicate surface such as a food product in a low viscosity, easily flowable state. The image can be sufficiently robust to be discerned for a period of time in which the product is further processed, served and/or consumed. For example, substantial image quality can be maintained for a period of 15, 30 or 45 or more minutes with the food product in a low viscosity state. The image does not substantially modify the viscosity of the food product and thus does not substantially alter the foods textural characteristics. The image can be quickly and inexpensively rendered using a drop-on-demand printing apparatus. The content of the image can be selected immediately prior to printing. The image can be customized to identify the food product, the producer, or the consumer.

Still further aspects, features, and advantages follow. For example, combinations and ranges of, e.g. gravity flowability, viscosity, bleed, resolution, food product types and other parameters are described below.

DESCRIPTION OF DRAWINGS

This patent application file contains at least one drawing executed in color. Copies of this patent or patent application publication with color drawing(s) will be provided by the Office upon request and payment of the necessary fee.

FIG. 1 is a schematic illustrating food product processing, while

Referring to FIG. 1, a food product is processed using a dispensing station 2 and a printing station 4. At the dispensing station 2, the food product 5 is dispensed from a dispenser 4 into a container(s) 6. The food product 5 is dispensed in a flowable state, e.g. a liquid or slurry, or is converted to a flowable state after dispensing. The printer station 8 includes a transport mechanism 10 and a printhead 12. The transport mechanism 10, e.g. a conveyor, supports and transports containers 6, including the food product, relative to the printhead 12. At the printhead 12, an ejection media is directed in the form of a series of drops 14 toward the surface of the food product in a predetermined pattern. Referring as well to FIG. 1A, the ejection media can be a pigmented material that is provided in a pattern forming a desired image 18 visible from the surface of the product. The food product can be served to a consumer shortly after the image is printed. For example, the food product can be a coffee drink. The image can, e.g., identify the food product, its producer, or the consumer or can be decorative.

Referring to FIG. 2, a food product is processed using a dispensing station 30, a printing station 32, a packaging station 34 and a post-printing processing station 36. At the dispensing station 30, the product is dispensed into a container 38. At the printing station 32, an ejection media is directed in the form of drops 40 to the surface of the food product in a predetermined pattern, e.g. to form an image while the food product is in a flowable state. At the processing 34 station, the package is sealed for distribution. In the embodiment illustrated, the packaging station includes a capper that assembles a cap 42 on the container 38. At the post-printing processing station, the food product is further processed. In the embodiment illustrated, the post-processing station 36 is a flash freezer to freeze the product. Flash freezing is a process step particularly suitable for ice cream products, which are typically sealed in containers before freezing. By printing an image on the product in a flowable state, the image can be rendered and maintained on the product without first freezing the product to a solid state. In addition, freezing a product after printing reduces diffusion of the media in the food product. In other embodiments, the post-processing station can include other processes that effect the viscosity or flowability of the food product. For sugar icing, used e.g. on cakes and pastries, the ejection media is applied while the icing is in a liquid state (typically melted) and the icing subsequently cooled to its solidification temperature, e.g. around room temperature. For yogurt, for example, post-processing may include culturing, which increases viscosity. For translucent products, such as Jello, post-processing can include solidifying followed by pouring another layer of food product over the imaged surface so that the image is within the bulk of the food product. The subsequent layer can also be imaged to create multiple images at various depths within the food product. Other post-printing processing steps include sterilization by heating or exposure to radiation. In embodiments, post-printing processes can be carried out before and/or after capping or otherwise enclosing the food product in a container.

Referring to FIG. 3, the printhead is an ink-jet printhead including a series of modules 52 from which media is ejected from an array of nozzles. For example, the printhead can include four modules, with each module printing a different color media to provide four color printing. The module 52 is preferably a drop-on-demand module including a piezoelectric element 56 which pressurizes ink in a pumping chamber 58 for ejection through a nozzle opening 60. In embodiments, the printhead includes a heater to heat the media to a desired viscosity to facilitate jetting. A suitable printhead is the NOVA printhead, available from Specta, Inc., Hanover, N.H. Suitable piezoelectric inkjet printers are also discussed in Fishbeck '227, Hine '598, Moynihan '346 and Hoisington '391, incorporated, supra and WO 01/25018, the entire contents of which is hereby incorporated by reference. In embodiments, the printhead is moved relative to a food product during printing.

Figure 1:
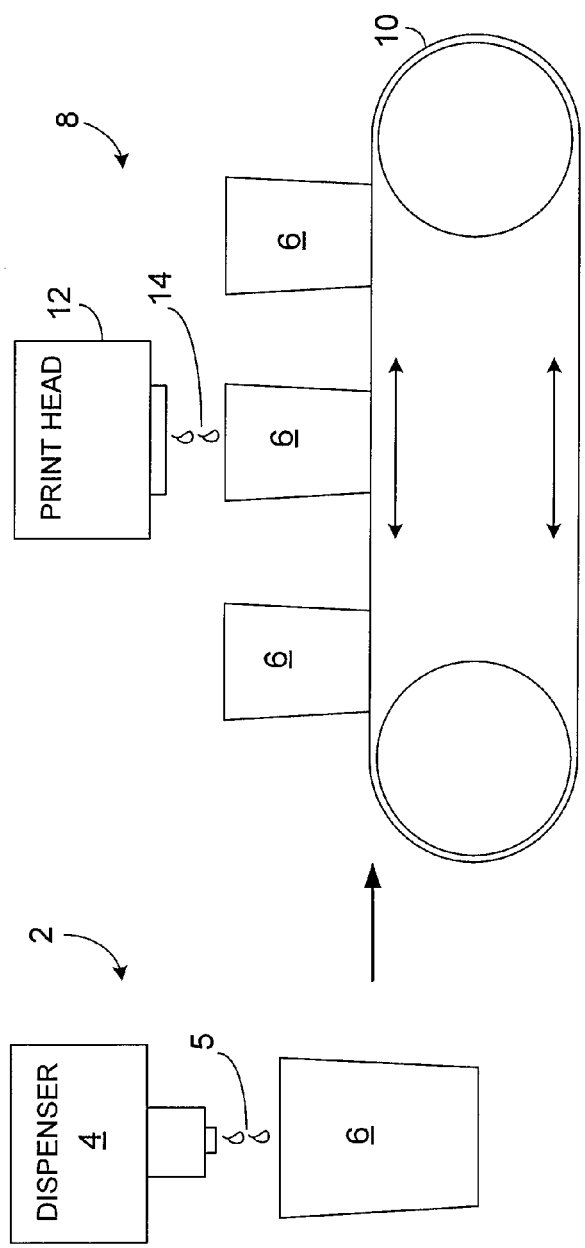
Figure 1A:
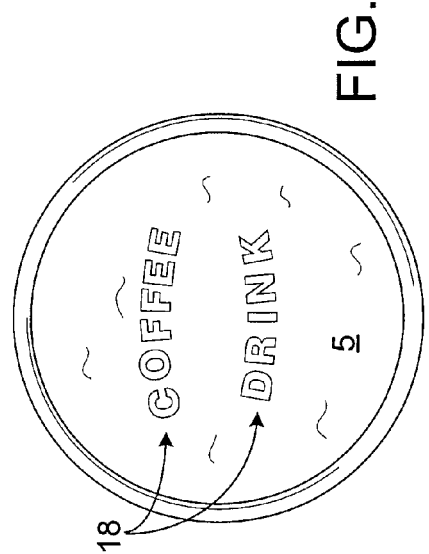
FIG. 1A is a food product including a printed image.
Figure 2:
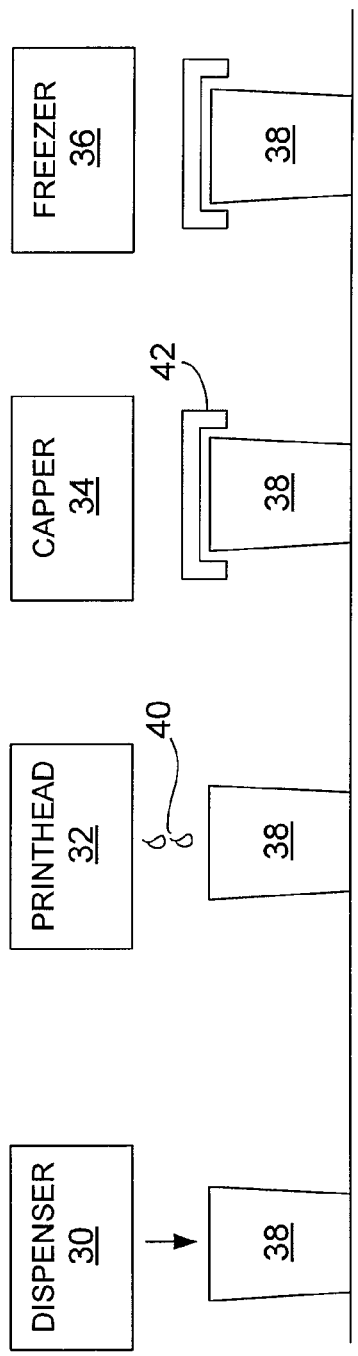
FIG. 2 is a schematic illustrating food product processing.
Figure 3:
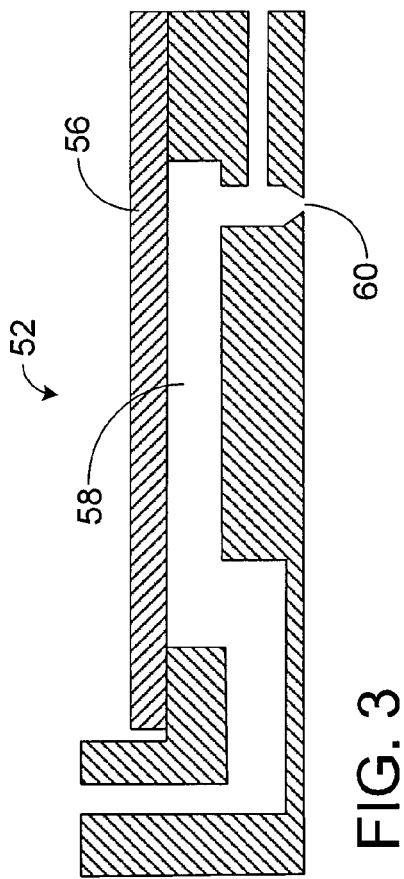
FIG. 3 is a cross-sectional view of a printhead module.

Suitable images are produced by selecting the printing conditions so that the media is ejected in the form of drops that prevent excessive splashing or cratering when the drops impact the food product surface and thus, the integrity of the image is maintained. In addition, small drops of heated media cool quickly on impact with the food product and do not transfer excessive heat to the food product, which facilitates further processing. For food products having a viscosity of about 50,000 cps or less, particularly 2,500 cps or less, suitable drop sizes are about 200 pl or less, e.g. 60-100 pl. The velocity of the drops is about 2-12 m/sec, e.g. about 7-9 m/sec. The printing resolution is about 50 dpi or greater, e.g. about 150-500 dpi. In embodiments, media is heated, e.g. to about 40 to 125° C., to maintain a desired jetting viscosity, e.g. about 10-20 cps. Viscosity is measured by using a rotating cylinder-type viscosometer. A suitable instrument is the Model DV-III Programmable Rheometer with Thermoset System 3 sample holder controlled by a Model 106 Programmable Temperature Controller, available from Brookfield, Middleboro, Mass. At 60 rpm with a #18 spindle, the system can measure viscosity up to about 49.9 cps. Higher viscosities can be measured with a parallel plate viscometer.

During printing, the food product is in a state in which it has a delicate, easily damaged surface and, typically, is flowable. For example, the food product can be a liquid or a paste. In embodiments, food product can be characterized by its flowability under gravity. Flowability is measured as follows. The food product is disposed in a teflon cylindrical container that has one open end and is 3 inches tall and 3 inches in diameter. A flat teflon plate is placed over the open end. The container is inverted and vertically removed to produce a column of the food product. The flowability of the food product is indicated by changes in the height of the column. A reduction in height of 1:5 inches indicates 50% flow. In embodiments, the food product has a gravity flowability of 50% or more in 24 hours or less, e.g. 10 minutes or less, or 10 seconds or less. For example, the flowability in embodiments is such that the food product flows freely when the cylinder is removed and no self-supporting column is formed.

In embodiments, the state of the food product can be characterized by its viscosity. A suitable viscosity is about 50,000 cps or less, e.g. 2500, 200, 100, 80 or 50 cps or less. In embodiments, the viscosity of the food product during printing is greater than the viscosity of water at room temperature. In embodiments, the viscosity of the food product is adjusted relative to the viscosity of the ejection media. For example, the viscosity of the food product is preferably less than the viscosity of the ejection media to reduce spread of the media into the food product and to retain image integrity. In embodiments, the viscosity of the food product is 75% or less than the viscosity of the ejection media at the food product temperature.

In addition, the food product is preferably in a state in which it maintains a substantially stable consistency so that the image is maintained for an extended period. The state of the food product is preferably substantially stable under printing conditions and/or conditions maintained until post-printing processing or consumption. A food product with a stable consistency, exhibits a substantially constant gravity flowability or density. Preferably these properties are maintained within ±10% during printing and until the product is consumed or further processed. In embodiments, food product consistency is stable for e.g. 10 minutes or more, or 30 minutes or more under printing conditions.

The flowability, stability and/or viscosity can be a characteristic of the product in the state in which it is consumed or the product can be treated, e.g. heated or cooled prior to or during printing, to establish a desired flowability or viscosity. For example, the product may be at a temperature above freezing, e.g. in a temperature range of about 40 to 120° F., e.g. at room temperature. In embodiments, the product is substantially solid in its consumed state but is heated to a flowable viscosity state for imaging. Examples of food products that are melted include chocolate, icing, jello, and pudding.

In embodiments, the food products include a low water solubility component in about 1%, 5% or 50% or more by weight. In embodiments, the food product includes milk products such as ice cream, yogurt, and milk shakes, coffee products including milk products, such as lattes and cappacinos, and chocolate in bulk or as toppings or icings. A common low water solubility component is a lipid. Suitable lipids include nonpolar extractions from plant or animal matter, and are typically fatty acid derivatives of glycerol. Examples include fats and oils which include triestes of glycerol (triacylglycerols). Other lipids include phospholipids (glycerol esterified with phosphoric acid) or sphingolipds (amino glycerol derivatives). Fats are solid at room temperature, while oils are typically liquid at room temperature. Suitable fats and oils include animal butter, lard, cod liver oil, whale oil, cocoa butter, coconut, corn, cottonseed, linseed, olive, peanut, or soybean extracts. Fatty acid components include lauric, myristic, palmitic, polmitoleic, oleic, linoleic, and linoleic acid. In other embodiments, the food product is substantially watersoluble. Embodiments include food products composed primarily of protein, e.g. gelatins, such as jello. The food product can also include a wax, a resin, or an emulsifier or other thickener.

In embodiments, the media has a solvent-based carrier which evaporates during jetting or after impacting the food product. In embodiments, the media includes a meltable carrier which solidifies on the food product. The viscosity of these media is typically relatively low when ejected from the nozzle and on impact with the food product, which reduces splashing or cratering effects. The viscosity of the media then increases, as the solvent carrier evaporates or as the carrier solidifies, which reduces spread of the media into the food products. A suitable solvent carrier is a low molecular weight alcohol, e.g. ethanol. A suitable meltable carrier is animal fat or a wax. In embodiments, the viscosity of the media is about 20 cps or less during jetting, e.g. 10-20 cps, and the viscosity at food product temperature is 20-200 cps or more. In embodiments, viscosity at jetting is 10-20 cps and the media is heated to 40-125° C., e.g. the viscosity is 12-14 cps at 50 to 60° C. In embodiments, the solubility of the media or major components of the media is low in the food product to reduce diffusion of media into the food product. For food products including non-polar, e.g. lipid ingredients, the media or its major components are generally polar and have a high solubility, e.g. are miscible, in water. For example, in embodiments, the media includes a highly water-soluble carrier that is e.g. 50%, or 70% or more of the media. Suitable highly water soluble carriers include water, acids, and alcohols. A suitable carrier is propylene glycol. For food products that are substantially water soluble, the media can include a carrier that has low water solubility, such as animal fat. The media can also include colorants, such as organic dyes, stabilizers, flexibilizers, plasticizers, and/or other additives. In embodiments, the media includes a flavoring but does not include a colorant or includes a colorant that is non-contrasting with the food product. In these embodiments, a flavor component can be distributed in a predetermined pattern without forming a visible image. Ingredients suitable for edible media are described in WO 03/048260, the entire contents of which are hereby incorporated by reference. Suitable flavorings include sugars, or extracts, such as fruit spice extracts. The media preferably includes edible components that are listed as a Generally Recognized as Safe direct food additive (GRAS) in section 21 of the Code of Federal Regulations or is EAFUS-listed, i.e., included on the Food and Drug Administration's list of "everything added to food in the United States." An "edible media" is an ink that contains less than 100 ppm by weight of any impurities, i.e., any components that are not listed as GRAS or are not EAFUS-listed. A suitable media is available as the "FG" family of inks, from Sensient Imaging Technologies, Inc., Escondido, Calif. The inks are available in red, green, blue and yellow.

In embodiments, the image on the food product is maintained for a substantial period, e.g. 10 minutes or more, e.g. 30 minutes or more, without further modification of the food product so that the image is discernable when it is further processed and/or served to a consumer. Changes in image quality for a particular food product and ejection fluid can be determined by measuring how much the media bleeds laterally over time. To determine the amount of bleed for a particular media, a monochromatic square having dimensions of 0.25 inch on each side is deposited onto the food product. The width of the square is then monitored over time. The increase in width is expressed as a percentage of the original width to indicate image quality retention. In embodiments, the image bleed is about 10% or less, e.g. 2% or 1% or less over 10 minutes or more, e.g. 30 minutes or more.

EXAMPLE

Figure 4:
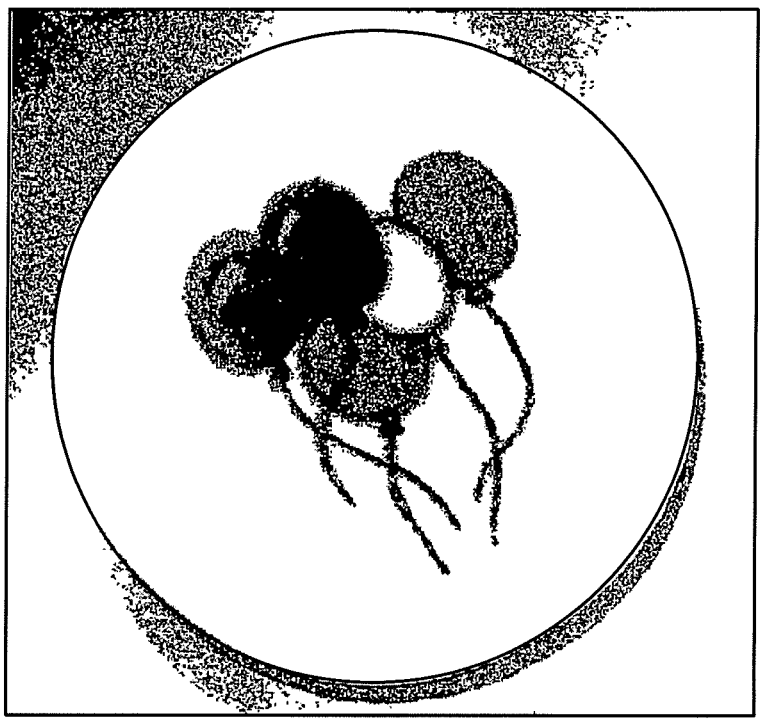
FIG. 4 is a photograph of a food product including a printed image.

Referring to FIG. 4, an image of floating balloons in four colors was printed on an ice-milk coffee drink. The food product includes as ingredients coffee and milk products. The viscosity of the food product during printing was about 80-100 cps. The temperature of the food product was below room temperature and above 32° F. The food product was in a paper cup having a diameter of about 2.5 inches and height of 2 inches. The image was printed using a Spectra Model JetXpress-4/FG printer, available from Spectra, Inc., Hanover, N.H. The printer includes a printhead having an array of jetting nozzles extending over about 1.25 inches. The nozzles have a diameter of about 52 micron. The drop size was about 80 pL, the resolution was about 203 dpi, and the head temperature was about 55° C. The food product was moved relative to the printhead on a conveyor at a rate of about 25 feet/minute. The distance from the head to the surface of the food product was about 1 cm. The jetting media was the "FG" family of inks from Sensient/Formulabs, Escondido, Calif. The inks are composed, in order of decreasing amount, propylene glycol, glycerine, purified water, isopropyl alcohol, and organic dye. The blue ink includes FD&C Blue No. 1 and Red No. 3. The red ink includes Red. No. 3, Red No. 40, and Blue 1. The yellow ink includes Yellow No. 5, Red. No. 40, and Blue No. 1. The green ink includes Yellow No. 5, Blue No. 1, and also includes sodium hydroxide. These inks are, respectively, not less than 2.1%, 2-3%, 2.0%, and 2.0% pure dye. The image persisted on the food product without substantial bleeding for about 30 minutes.

Still further embodiments are in the following claims. For example, images can be printed on delicate, flowable substrates other than food products.

What is claimed is:

1. A process, comprising:
    ejecting a jettable media onto a surface of a food product from an ink jet printer as a series of fluid drops in a predetermined pattern on the surface, while the food product that bears the surface both (a) is in a stable state such that the predetermined pattern on the surface will be maintained for a period of at least 10 minutes, and (b) has a gravity flowability of 50% or more in 24 hours or less, and
    after ejecting the media, reducing diffusion of the jettable media in the food product and reducing the flowability of the food product.

2. The process of claim 1 wherein the media has a viscosity greater than a viscosity of the food product at a temperature of the food product during application of the media.

3. The process of claim 2 wherein reducing diffusion of the jettable media includes cooling the food product.

4. The process of claim 3 wherein reducing diffusion of the jettable media includes cooling the food product to about 32° F. or less.

5. The process of claim 1 comprising, after ejecting the media, enclosing the food product in a container.

6. The process of claim 1 wherein before ejecting the media, the food product has a viscosity of about 50,000 cps or less.

7. The process of claim 1 wherein the food product has a viscosity of about 50 to 110 cps before ejecting the media and the drop volume is about 120 pL or less.

8. The process of claim 1 wherein the ink jet printer comprises a drop on demand ink jet printer.

9. The process of claim 8 wherein the ink jet printer comprises a piezoelectric ink jet printer.

10. The process of claim 1 comprising heating the media to a temperature of about 40 to 140° C.

11. The process of claim 1 comprising printing at a resolution of 50 dpi or more.

12. The process of claim 1 wherein the media has a viscosity of about 8-20 cps when the media is ejected from the ink jet printer.

13. The process of claim 1 wherein the media has a viscosity of about 70-100 cps at 68 degrees F.

14. The process of claim 1 wherein the media has a water soluble carrier.

15. The process of claim 1 wherein the media comprises predominantly an alcohol or acid, or water or combination thereof.

16. The process of claim 1 wherein the media comprises predominantly a fat or a wax and is a solid at 68 degrees F.

17. The process of claim 1 wherein the media is insoluble in the food product.

18. The process of claim 1 wherein the media includes a visible dye.

19. The process of claim 1 wherein the media includes a flavor additive.

20. The process of claim 1 wherein the food product comprises a dairy product.

21. The process of claim 20 wherein the food product comprises ice cream or yogurt.

22. The process of claim 1 wherein the food product comprises a coffee drink including a dairy product.

23. The process of claim 1 wherein the food product is in a temperature range of about 40 to 120° F. while ejecting the media.

24. The process of claim 1 comprising:
    serving said food product to a consumer within about 45 minutes of ejecting said media.

25. The process of claim 1 wherein the media on the food product has a lateral image bleed of about 10% or less after 10 minutes.

26. The process of claim 1 further comprising providing an ink jet printer capable of ejecting the series of fluid drops.

27. The process of claim 1 wherein the fluid drops have a drop volume of about 200 pL or less.

28. The process of claim 1, wherein providing the food product in a flowing state includes dispensing the food product from a dispenser into a container.

29. The process of claim 28, further comprising, after dispensing the food product into the container, transporting the container on a conveyor to a printing station.

30. The process of claim 29, wherein, at the printing station, the jettable media is ejected on the surface of the food product.

31. The process of claim 1, further comprising, after ejecting the media, transporting the food product in a container to a packaging station to seal the container.

32. The process of claim 1, further comprising, after ejecting the media, transporting the food product in a container to a post-processing station to reduce diffusion of the jettable media in the food product.

33. The process of claim 32, wherein the post-processing station comprises a freezer.

34. A process, comprising:
    ejecting a media onto a surface of a food product from an ink jet printer as a series of drops in a predetermined pattern on the surface, while the food product that bears the surface both (a) is in a stable state such that the predetermined pattern on the surface will be maintained for a period of at least 10 minutes, and (b) has a gravity flowability of 50% or more in 24 hours or less, and
    after ejecting the media, reducing diffusion of the jettable media in the food product and reducing the flowability of the food product, the media on the food product having a lateral image bleed of about 10% or less in 30 minutes.

35. The process of claim 34 comprising after ejecting the media, enclosing the food product in a container.

36. The process of claim 35 comprising enclosing the food product in a container prior to reducing diffusion of the jettable media.

37. The process of claim 34 further comprising providing an ink jet printer capable of ejecting the series of fluid drops.

38. The process of claim 34 wherein the drops have a volume of about 200 pL or less.

* * * * *